(12) United States Patent
Eggers

(10) Patent No.: US 12,726,104 B2
(45) Date of Patent: Sep. 1, 2026

(54) METHOD FOR ACTUATING A FIRST AND A SECOND SWITCH ELEMENT OF A HALF-BRIDGE IN A CURRENT CONVERTER, AND CURRENT CONVERTER HAVING A HALF-BRIDGE

(71) Applicant: Robert Bosch GmbH, Stuttgart (DE)

(72) Inventor: Philipp Eggers, Delligsen (DE)

(73) Assignee: Robert Bosch GmbH, Stuttgart (DE)

( * ) Notice: Subject to any disclaimer, the term of this patent is extended or adjusted under 35 U.S.C. 154(b) by 161 days.

(21) Appl. No.: 18/710,363

(22) PCT Filed: Sep. 29, 2022

(86) PCT No.: PCT/EP2022/077169
§ 371 (c)(1),
(2) Date: May 15, 2024

(87) PCT Pub. No.: WO2023/094053
PCT Pub. Date: Jun. 1, 2023

(65) Prior Publication Data

US 2025/0274033 A1 Aug. 28, 2025

(30) Foreign Application Priority Data

Nov. 25, 2021 (DE) ..................... 10 2021 213 295.2

(51) Int. Cl.
*H02M 1/088* (2006.01)
*H02M 1/00* (2006.01)
*H02M 3/335* (2006.01)
*H02M 7/521* (2006.01)

(52) U.S. Cl.
CPC ......... *H02M 1/088* (2013.01); *H02M 1/0003* (2021.05); *H02M 3/33569* (2013.01); *H02M 7/521* (2013.01)

(58) Field of Classification Search
CPC ............... H02M 1/088; H02M 1/0003; H02M 3/33569; H02M 7/521
See application file for complete search history.

(56) References Cited

U.S. PATENT DOCUMENTS 6,819,149 B2 11/2004 Shirasawa et al.
7,098,640 B2 8/2006 Brown
7,141,957 B2 11/2006 Tolle et al.
(Continued)

FOREIGN PATENT DOCUMENTS

DE 102010043109 A1 5/2012

OTHER PUBLICATIONS

Translation of International Search Report for Application No. PCT/EP2022/077169 dated Jan. 18, 2023 (2 pages).

*Primary Examiner* — Adolf D Berhane
(74) *Attorney, Agent, or Firm* — Michael Best & Friedrich LLP

(57) ABSTRACT

The invention relates to a method (400) for actuating a first (120) and a second (140) switch element of a half-bridge (110) in a current converter (100). The method comprises the steps of: setting (430) a first variation of the first current profile by means of a first gate driver (122) at the first control contact (124) for closing the first switch element (120); and setting (432) a second variation of a second current profile by means of the second gate driver (142) at the second control contact (144) during the closure of the first switch element (120).

9 Claims, 5 Drawing Sheets

(56) References Cited

U.S. PATENT DOCUMENTS

| | | | | |
|---|---|---|---|---|
| 7,548,050 | B2 * | 6/2009 | Shirai | H03K 17/6871<br>323/283 |
| 2008/0265975 | A1 | 10/2008 | Takasu et al. | |
| 2013/0241516 | A1 * | 9/2013 | Ueno | G05F 1/618<br>323/285 |
| 2023/0344345 | A1 * | 10/2023 | Oner | H02M 3/1588 |

* cited by examiner

METHOD FOR ACTUATING A FIRST AND A SECOND SWITCH ELEMENT OF A HALF-BRIDGE IN A CURRENT CONVERTER, AND CURRENT CONVERTER HAVING A HALF-BRIDGE

BACKGROUND

The invention relates to a method for actuating a first and a second switch element of a half-bridge in a current converter and a current converter having a half-bridge. Furthermore, the invention relates to a drivetrain comprising a corresponding current converter and a vehicle comprising a drivetrain, as well as a computer program and a computer-readable medium.

Current converters having half-bridges are known from the prior art. Such current converters are preferably used as inverters in electrical drivetrains to supply multiphase electrical machines with energy from a DC voltage source for driving a vehicle. The use of such current converters as DC converters is also known, for example to step down a high voltage of a traction battery to a low voltage of a vehicle's electrical system or vice versa. Also known is usage in a mobile or stationary charging device for charging the traction batteries of a vehicle. Such current converters are preferably used in a power range from approximately 5 kilowatts to several hundred kilowatts. Methods for actuating a switch element of a half-bridge in a current converter are also known. DE 10 2010 043 109 A1 discloses a circuit arrangement for this purpose, which comprises a switching element that is controlled by a pulse-width modulated signal, whereby at least one of the rising edge and the falling edge of the pulse-width modulated signal is influenced as a function of a temperature. At the switching time or switching moment, the switch element, preferably a transistor, switches from a high-impedance to a low-impedance state or vice versa from a low-impedance to a high-impedance state, depending on whether the switch element is switched on or off, i.e. closed or open. The undesirable power loss occurring in the switch element during this switching is approximately proportional to the switching time. To minimize the power loss, attempts are made to shorten the switching time. However, undesirable electromagnetic interference occurs when switch elements are switched. Electromagnetic interference increases with shorter switching times or changeover times. There is therefore a need for improved actuating methods that enable a reduction in electromagnetic interference, even given minimized switching times.

SUMMARY

A method for actuating a first and a second switch element of a half-bridge in a current converter is provided. The actuating comprises maintaining a switching status and closing or opening a switch element. The current converter comprises an input connector for connecting a DC voltage source, an output connector for connecting a load in parallel to the second switch element of the half-bridge, a first gate driver for actuating the first switch element, and a second gate driver for actuating the second switch element. The first and second switch elements are connected in series between the potentials of the input connector, and an intermediate tap between the first and second switch elements is connected to the output connector. The first gate driver sets a first current profile at a first control contact for actuating the first switch element by setting a first voltage and/or a first impedance at the first control contact of the first switch element. The second gate driver sets a second current profile at a second control contact for actuating the second switch element by setting a second voltage and/or a second impedance at the second control contact of the second switch element. During operation of the current converter, the first switch element is continuously and repeatedly closed and opened, and the second switch element is then closed and opened so that one of the potentials of the input connector is alternately applied to the output connector. Preferably, the first and second switch elements are open before the start of the process or initially. Preferably, while the open switching status of the first and second switch elements is maintained, the first and second current profiles are constant. The method comprises the steps of: reading in at least one parameter which characterizes an operating point of the half-bridge, determining a first variation of the first current profile as a function of the parameter, setting the first variation of the first current profile by means of the first gate driver at the first control contact for closing the first switch element. determining a second variation of the second current profile as a function of the parameter, setting the second variation of the second current profile by means of the second gate driver at the second control contact during the closing of the first switch element.

A method for actuating a first and a second switch element of a half-bridge in a current converter is provided. Preferably, a switch element is a controllable semiconductor switch, preferably a MOSFET, an IGBT or a transistor. Preferably, the switch elements are silicon, silicon carbide, gallium nitride or gallium arsenide semiconductor switches. Preferably, the switch elements comprise an intrinsic diode or a diode is connected in antiparallel to each of the switch elements. Preferably, the current converter is an inverter, inverter or pulse inverter or a DC converter or part of a charging device. Actuating comprises maintaining a switching status, preferably the open or closed switching status, closing or opening a switch element. The current converter comprises an input connector for connecting a DC voltage source, an output connector for connecting a load in parallel to the second switch element of the half-bridge, a first gate driver for actuating the first switch element, and a second gate driver for actuating the second switch element. The first and second switch elements are connected in series between the potentials of the input connector and are thus designed as a half-bridge. An intermediate tap between the first and second switch elements is connected to the output connector. The circuit arrangement thus makes it possible to absorb energy from a DC voltage source and to provide this energy via the output connector (or vice versa) when one of the switch elements is closed. The simultaneous permanent maintenance of the closed switching status of the switch elements must be avoided so that no permanent short circuit occurs between the potentials of the input connector. Any energy source connected between the potentials would be short-circuited. If the open switching status of both switch elements is permanently maintained at the same time, the input connector is electrically isolated from the output connector. The current converter comprises gate drivers for actuating the switch elements. The first gate driver sets a first current profile at the first control contact in order to actuate the first switch element, preferably by setting a first current, a first voltage, and/or a first impedance at the first control contact of the first switch element. The second gate driver sets a second current profile at the second control contact in order to actuate the second switch element, preferably by setting a second current, a second voltage, and/or a second impedance at the second control contact of the second switch element. The gate drivers are used to set a current profile at the control contacts (gate) of the switch elements as a function of a switch signal. Switching signals are preferably digital signals (on/off) that a gate driver receives and as a function of which the current profile is set. Preferably, the gate driver sets a constant current profile as long as the states of the switching signals of both switch elements do not change in order to maintain the switching status of the switch elements. Preferably, if the switching signal changes its state, the gate driver varies the current profile until the switching status of the switch element has changed. Preferably, both switch elements are initially open. This means that the digital switching signals received by both gate drivers specify the switching status Open. Preferably, the first switch element is high-impedance. Given a connected, preferably inductive, load in parallel with the second switch element, a load current flows through the diode of the second switch element. This behavior preferably results in said switching state due to the transient processes during operation of the half-bridges at a connected load. Preferably, the first and second current profiles at the first and second control contacts are constant. The method comprises the following steps: reading in a parameter that characterizes an operating point of the half-bridge. A sensor device is used to read in at least one parameter that characterizes a, preferably current, operating point of the half-bridge. A corresponding parameter is, e.g. a temperature of the half-bridge, a load current through the half-bridge, a voltage applied to the half-bridge or to the potentials of the input connectors, and/or information about the switching status (closed, closing, open, opening) of the first and/or second switch elements of the half-bridge. Depending on the operating point, the properties of the switch elements and in particular the intrinsic diode of the switch elements or the diodes preferably arranged within the half-bridge in addition to the switch elements in anti-parallel change. As a result, the reverse voltage of the second switch element is absorbed differently depending on the operating point. This in turn means that the first switch element can be switched on at different speeds. By varying the current profile depending on the operating point, it is possible to dampen the sharp voltage increase across the second switch element (high du/dt) when the reverse voltage is picked up and thus enable the first switch element to close even faster. Depending on at least one of these pieces of information provided by the parameter, a first variation of the first current profile is determined at the first control contact. To close the previously opened first switch element, the determined first variation of the first current profile is set by means of the first gate driver. A second variation of the second current profile is determined as a function of at least one of the information provided by the parameter. During the closing of the first switch element, the determined second variation of the second current profile is set by means of the second gate driver. Consequently, both the first and second current profiles at the first and second control contacts are varied in order to close the first switch element as a function of the parameter read in. The first variation of the first current profile is used to close the first switch element. The switching status of the first switch element changes from open to closed. The first switch element is thereby transferred from a high-impedance state to a low-impedance state. Depending on the parameter, the switching losses of the first switch element and the EMC emissions of the second switch element are preferably minimized. After the first switch element is closed, the first current profile at the first control contact is set according to the closed switching status. The second variation of the second current profile at the second control contact, which is also determined as a function of the parameter, differs from the first variation. By means of the second variation of the second current profile, the electrical properties, i.e. the resistive, capacitive and/or inductive properties, of the second switch element are changed during the closing of the first switch element. Depending on the parameter, the behavior of the diode of the second switch element, i.e. the intrinsic diode or the diode preferably arranged within the half-bridge in addition to the second switch element in antiparallel, is preferably influenced. During the closing of the first switch element, the commutation of the load current from the second switch element to the first switch element, preferably from the intrinsic or anti-parallel switched diode of the second switch element to the first switch element, takes place. After the first switch element is closed, the second current profile at the second control contact is preferably set again according to the open state of the second switch element before the first switch element was closed.

Due to the variation of the current profiles at the control contacts on both the first and the second switch element during the closing of the first switch element, electromagnetic emissions and switching losses are advantageously minimized.

Advantageously, high-frequency surges occurring at the second switch element during the closing of the first switch element are minimized, and their amplitude is reduced. Advantageously, reliable closure of the first switching element is performed at minimum electromagnetic emissions, preferably at the second switching element.

In another embodiment of the invention, the current converter comprises a data storage means. The data storage means comprises a map, whereby variations of the first and second current profile are associated with different values of the parameter in the map. Determining a first variation of the first current profile and a second variation of the second current profile as a function of the parameter comprises selecting a first variation of the first current profile and a second variation of the second current profile from the map as a function of the value of the parameter read in.

A method is provided for actuating a first and a second switch element of a half-bridge in a current converter, whereby the current converter comprises a data storage means. The latter is, e.g., a memory chip.

A characteristic map is stored in the data storage means. The characteristic map comprises both a plurality of current profiles and a plurality of values of at least one parameter, whereby the current profiles are associated with different values of the at least one parameter. Preferably, the correlations between the current profiles and the parameters and the associated with each other are determined empirically by means of a calibration of the current converter in advance of operation. Depending on the determined or read value for the parameter, a first variation of the first current profile and a second variation of the second current profile are selected from the characteristic map based on the association.

Advantageously, an option is provided of determining a variation of the current profile as a function of the parameter read in.

In another embodiment of the invention, the current converter comprises a model of the first and/or second switch element. Determining a first variation of the first current profile and a second variation of the second current profile as a function of the parameter comprises determining a first variation of the current profile and a second variation of the second current profile by means of the model as a function of the value of the parameter read in.

A method for actuating a first and a second switch element of a half-bridge in a current converter is provided, whereby the current converter comprises a model of the first and/or second switch element, preferably of the half-bridge. Preferably, the model, e.g. a mathematical or physical model, describes the electronic relationships of the switch elements by means of mathematical and/or physical formulae, also as a function of a value of the at least one parameter. Preferably, a trained neural network or a machine learning system is used alternatively to determine the first and second variation depending on the parameter. The neural network or machine learning system is preferably trained and adapted using data from other current converters over the runtime of the current converter by means of a connection to an internet cloud. The model is used to determine a first variation of the current profile and a second variation of the second current profile depending on the value of the parameter.

Advantageously, an option is provided of determining a variation of the current profile as a function of the parameter.

In another embodiment of the invention, setting the first variation of the first current profile by means of the first gate driver to close the first switch element comprises increasing the voltage at the first control contact. The setting of the second variation of the second current profile by means of the second gate driver during the closing of the first switch element comprises a chronologically limited variation at the second control contact, in particular of an amplitude, a basic shape, a pulse width, the level of a constant current profile, during the increase of the voltage at the first control contact, in particular within the period in which the voltage at the first control contact increases from a first voltage value to a second voltage value.

Provided is a method, in which setting the first variation of the first current profile by means of the first gate driver to close the first switch element comprises or causes an increase in the voltage at the first control contact. The setting of the second variation of the second current profile by means of the second gate driver during the closing of the first switch element comprises a chronologically limited variation of the current profile at the second control contact during the increase of the voltage at the first control contact. The term "chronologically limited" means that a constant current profile is only varied to maintain the open switching status of the second switch element after the voltage at the first control contact begins to increase. Before reaching the voltage value required for the closed switching status of the first switching element, which is then maintained in order to maintain the closed switching status of the first switching element, the second variation of the second current profile is ended and the constant current profile for maintaining the open switching status of the second switching element, which was already set before the chronologically limited second variation, is set again. Said another way, the term "chronologically limited" preferably means that the second variation is performed within the period of time in which the voltage at the first control contact increases from a first voltage value at which the first switch element is open to a second voltage value at which the first switch element is closed. Preferably, before and after the chronologically limited period a (preferably constant) current profile is set at the second control contact in order to maintain the open switching status. Preferably, the second variation comprises a change in an amplitude, a basic shape, a pulse width, the level of a constant current profile. Preferably, the level of the quantity exciting the electromagnetic emissions is influenced by changing the amplitude. Preferably, the electromagnetic emission is influenced by changing the basic shape. The basic shape can have any shape, preferably a constant current height, a trapezoidal, sawtooth, triangular or sinusoidal shape. Preferably, the duration of the damping of the quantity exciting the electromagnetic emissions is influenced by changing the pulse width.

Advantageously, a time range for a particularly effective influencing of the electromagnetic properties, preferably of the second switch element, during the closing of the first switch element and possible influencing variants are provided.

In another embodiment of the invention, setting the first variation of the first current profile by means of the first gate driver to close the first switch element comprises increasing the voltage at the first control contact. The setting of the second variation of the second current profile by means of the second gate driver during the closing of the first switch element comprises a chronologically limited increase of the impedance or the voltage at the second control contact during the increase of the voltage at the first control contact, in particular within the period in which the voltage at the first control contact increases from a first voltage value to a second voltage value.

Provided is method in which setting the first variation of the first current profile by means of the first gate driver to close the first switch element comprises or causes an increase in the voltage at the first control contact. The setting of the second variation of the second current profile by means of the second gate driver during the closing of the first switch element comprises a chronologically limited increase in the impedance or the voltage at the second control contact. The term "chronologically limited" preferably means that a constant current profile for maintaining the open switching status at the second control contact of the second switch element is only varied after the voltage at the first control contact begins to increase. Before reaching the voltage value required for the closed switching status of the first switch element, which is then maintained to maintain the closed switching status of the first switch element, the second variation of the second current profile is ended at the second control contact and the constant current profile for maintaining the open switching status is set again at the second control contact, which was already set before the chronologically limited second variation. Said another way, the term "chronologically limited" preferably means that the second variation is performed within the period of time in which the voltage at the first control contact increases from a first voltage value at which the first switch element is open to a second voltage value at which the first switch element is closed. Preferably, before and after the chronologically limited period, a (preferably constant) current profile is set at the second control contact in order to maintain the open switching status. Preferably, a modified second current profile is set for a limited time at the second control contact of the second switch element, whereby the current flowing through the drain gate, collector gate or Miller capacitance is set in such a targeted manner that the gate source capacitance and thus the gate is controlled such that the otherwise occurring high-frequency transients are damped in a controlled manner, and the reverse voltage is absorbed at a lower du/dt.

Advantageously, a time range for a particularly effective minimization of electromagnetic emissions during the closing of the first switch element and a suitable variation of the current profile at the second control contact of the second switch element are provided.

In another embodiment of the invention, the current profile at the second control contact of the second switch element is detected during the closing of the first switch element. Depending on the current profile detected at the second control contact, the second gate driver sets a third current profile at the second control contact of the second switch element by setting a third voltage and/or a third impedance, which prevents the second switch element from closing.

A method is provided in which the current profile at the second control contact of the second switch element is detected during the closing of the first switch element. The current is detected, for example, by means of a current measuring device on the second control contact. The current is preferably determined using a shunt, an analog-to-digital converter and/or a current mirror. Depending on the detected current profile at the second control contact, the second gate driver sets a third current profile at the second control contact of the second switch element by setting a third voltage and/or a third impedance. In this case, this third current profile replaces the second variation of the second current profile, preferably for the remaining period of the second variation, and prevents the second switch element from closing while the first current profile is closing. Preferably, a lower impedance is set as the third impedance or a lower or more negative voltage is set as the third voltage than in the second variation of the second current profile.

Advantageously, process steps are provided that prevent an unintentional short circuit in the event of a fault. Preferably, a particularly effective minimization of the electromagnetic emissions of the second switch element is ensured during the closing of the first switch element.

The invention further relates to a current converter comprising a half-bridge having a first and a second switch element, the current converter comprising an input connector for connecting a DC voltage source, an output connector for connecting a load in parallel to the second switch element of the half-bridge, a first gate driver for actuating the first switch element, and a second gate driver for actuating the second switch element. Actuation comprises maintaining a switching status, closing, or opening a switch element. The first and second switch elements are connected in series between the potentials of the input connector. An intermediate tap between the first and second switch elements is connected to the output connector. Preferably by setting a first current, a first voltage, and/or a first impedance at a first control contact of the first switch element, the first gate driver sets a first current profile at the first control contact in order to actuate the first switch element. Preferably by setting a second current, a second voltage, and/or a second impedance at a second control contact of the second switch element, the second gate driver sets a second current profile at the second control contact in order to actuate the second switch element. During operation of the current converter, the first switch element is continuously and repeatedly closed and opened, and the second switch element is then closed and opened so that one of the potentials of the input connector is alternately applied to the output connector. Preferably, the first and second switch elements are open. The current converter is configured to read in a parameter that characterizes an operating point of the half-bridge. The current converter is configured to determine a first variation of the first current profile as a function of the parameter and to set the first variation of the first current profile by means of the first gate driver at the first control contact for closing the first switch element. Furthermore, the current converter is configured to determine a second variation of the second current profile as a function of the parameter and to set the second variation of the second current profile by means of the second gate driver on the second control contact during the closing of the first switch element.

The explanations hereinabove of the terms relating to the method also apply to the same terms relating to the current converter, and vice versa.

Advantageously, a current converter is provided in which, during the closing of a first switch element of a half-bridge, high-frequency surges occurring at the second switch element are minimized and their frequency is reduced. Advantageously, reliable closing of the first switch element is performed at minimal electromagnetic emissions, preferably at the second switch element.

The invention also relates to a drivetrain comprising a current converter and in particular comprising a traction battery as a DC voltage source and/or a phase or winding of an electric machine as a load. Such a drivetrain is, e.g., used to drive an electrical vehicle. Reliable operation of the drivetrain and operation with minimal electromagnetic emissions are enabled by means of the method and the current converter.

The invention further relates to a vehicle having a drivetrain, as described. Advantageously, a vehicle is thus provided which comprises a current converter which enables safe operation and low electromagnetic emission operation of the vehicle.

The invention further relates to a computer program comprising instructions that cause the current converter to perform the described method.

Furthermore, the invention relates to a computer-readable medium comprising instructions which, when executed by a current converter, performs the method steps described.

It is understood that the features, properties, and advantages of the method according to the invention apply or are applicable accordingly to the current converter or the drivetrain and the vehicle, and vice versa.

Further features and advantages of embodiments of the invention are apparent from the following description with reference to the accompanying drawings.

BRIEF DESCRIPTION OF THE DRAWINGS

The invention will be explained in further detail hereinafter with reference to the drawings.

DETAILED DESCRIPTION

Figure 1:
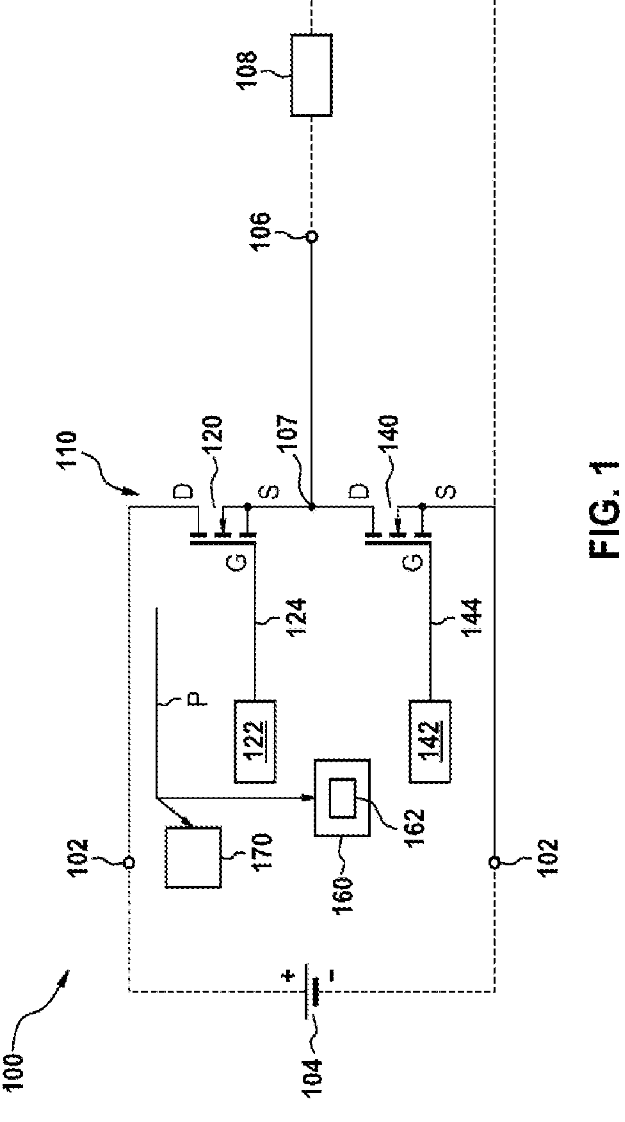
FIG. 1 a schematic representation of a current converter with a half-bridge, FIG. 2 schematic voltage, current/time diagrams showing a qualitative voltage progression at the control contacts of the switch elements and the voltages and currents at the switch elements.

FIG. 1 shows a current converter 100 comprising a half-bridge 110 having first 120 and second 140 switch elements. By way of example, the connections of the switch elements are labeled G (gate), D (drain), S (source). The current converter 100 comprises an input connector 102 for connecting a DC voltage source 104 and an output connector 106 for connecting a load 108 in parallel with the second switch element 140. When the second switch element 140 is closed, the load 108 is short-circuited. The DC voltage source 104 is, by way of example, shown as a battery or traction battery. However, said source can also be designed as any other desired DC voltage source, e.g. a fuel cell. Preferably, as shown in FIG. 1, the positive potential of the DC voltage source 104 can be connected to the upper input connector 102 and the negative potential of the DC voltage source can be connected to the lower input connector 102, so that the positive potential of the DC voltage source 104 can be connected to the first switch element 120 and the negative potential of the DC voltage source can be connected to the second switch element 140. Preferably and accordingly, the intrinsic diodes or the diodes that are preferably arranged within the half-bridge in addition to the switch elements 120,140 in anti-parallel are connected in the reverse direction so that a connected DC voltage source 104 is not short-circuited when the switches are open. An inductive load, e.g. a phase or winding of a multi-phase electrical machine, a choke, but also a combination of an inductive load with a resistive and/or capacitive load can be connected to the output connector 106 as a load 108 in parallel with the second switch element 140. The current converter further comprises a first gate driver 122 for actuating the first switch element 120 and a second gate driver 142 for actuating the second switch element 140. In electronics, especially power electronics, a gate driver (MOSFET driver, IGBT driver or half-bridge driver) is a discrete or integrated electronic circuit that controls power switches such as MOSFETs or IGBTs. Preferably, the gate driver 122, 142, at a control contact G, 124, 144 of a switch element influences the switching status of the switch element by means of a voltage or a current. Preferably, modern gate drivers or integrated control circuits no longer control the switch elements with simple voltage patterns, but use, e.g., a predetermined current profile as a function of the operating point. Preferably, the current and voltage commutation can be set separately for both the closing and opening of individual switch elements using such current profiles.

The actuating comprises maintaining a switching status, closing, or opening a switch element 120,140. The first 120 and the second 140 switch element are connected in series between the potentials of the input connector 102. An intermediate tap 107 is electrically connected to the output connector 106 between the first 120 and the second switch element 140. Accordingly, the load 108 is connectable between the output connector 106 and a potential of the input connector 102, which is also connected to the second switch element 140. By setting a first voltage and/or a first impedance at a first control contact 124 of the first switch element 120, the first gate driver 122 sets a first current profile at the first control contact 124 in order to actuate the first switch element 120. The setting of an impedance can preferably be performed by means of a switchable resistor combination. By setting a second voltage and/or a second impedance at a second control contact 144 of the second switch element 140, the second gate driver 142 sets a second current profile at the second control contact 144 in order to actuate the second switch element 140. During operation of the current converter 100, the first switch element 120 is repeatedly closed and opened and then the second switch element 140 is closed and opened, so that one of the potentials of the input connector 102 is alternately applied to the output connector 106. The current converter 100 preferably also comprises a data storage means 160 having a characteristic map 162 and/or a model 170. The current converter 100 is configured to read in a parameter P which characterizes an operating point of the half-bridge 110. The current converter 100 is also configured to determine a first variation of the first current profile and a second variation of the second current profile as a function of the parameter P read in, by means of the characteristic map 162 in the data storage means 160 and/or the model 170. The first variation of the first current profile is set by means of the first gate driver 122 at the first control contact 124 for closing the first switch element 120. The second variation of the second current profile is set by means of the second gate driver 142 at the second control contact 144 during the closing of the first switch element 120.

Figure 2:
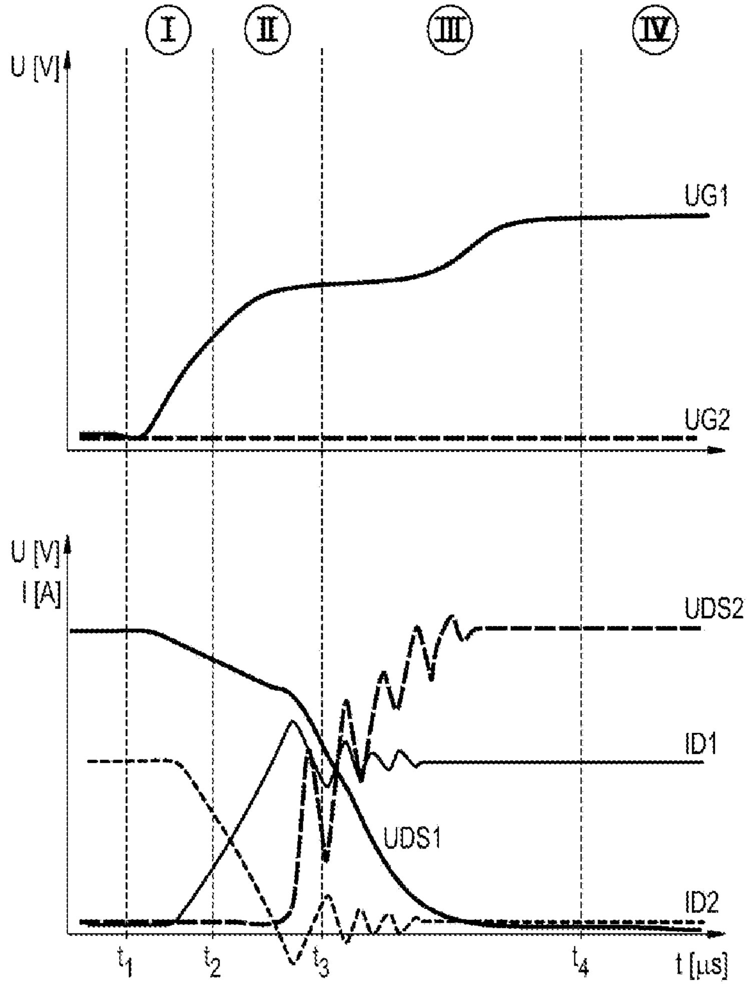

FIG. 2 shows schematic voltage/current/time diagrams known from the prior art. The upper diagram shows a qualitative voltage progression of the voltages UG1, UG2 at the control contacts 124, 144 of the switching elements 120, 140 over four successive phases I, II, III and IV. The lower diagram shows a simultaneous qualitative voltage progression of the voltages UDS1 and UDS2 across the first and second switch elements 120, 140. The voltage across the respective switching element is preferably the voltage that is present across the connection contacts drain and source or base and emitter. In addition, the current ID1 is shown through the first switch element 120 and the current ID2 through the second switch element 140. Beginning with phase I to phase IV, the first switch element is transferred from the open state to the closed state. Phase I starts at time t1, at which the setting of the first variation of the first current profile by means of the first gate driver 122 at the first control contact 124 for closing the first switch element 120 begins and consequently the voltage UG1 at the first control contact 124 increases. Phase II from time t2 describes the period of time at which the current commutation has already begun, i.e. the current ID1 through the first switch element 120 increases sharply and reaches its maximum as an overshoot until time t3, at which the current ID1 essentially settles to the load current and the current commutation ends. In the opposite direction, the current ID2 drops through the second switch element and reaches its minimum with the negative reverse current peak before settling at essentially zero amperes. Phase III from time t3 to time t4 describes the time from the end of current commutation. Voltage commutation has already begun and ends at time t4. Consequently, in phase III, the voltage UDS1 drops at the first switch element 120. At the second switch element 140, the voltage increases in the opposite direction. In phase IV from time t4, only the voltage UG1 at the first control contact 124 is kept further increased to minimize the conduction losses of the first switch element 120. During operation of the current converter 100, the first switch element 120 is repeatedly closed and opened and then the second switch element 140 is closed and opened, so that one of the potentials of the input connector 102 is alternately applied to the output connector 108. Preferably before and at the beginning of phase I, the voltages UG1 at the gate of the first switch element 120 and UG2 at the gate of the second switch element 140 are minimal. This results from the actuating by means of the gate drivers 122, 142 at the control contacts 124,144. Accordingly, both switch elements 120 and 140 are open at this time. This means that the digital switching signals received by both gate drivers specify the switching status Open. Preferably, the first switch element 120 is high-impedance. A load current, the current ID2, flows through the diode of the second switch element 140. This behavior in this switching status preferably results from the transient processes during operation of the half-bridge with a connected load 108, preferably an inductive load, preferably in parallel with the second switch element 140. In FIG. 1, the first switch element 120 is on the one hand connected to the high potential of the DC voltage source 104. Therefore, a high voltage UDS1 is present across the first switch element 120. The potential at the intermediate tap 107 is at a low potential because the current ID2 flows through the load 108 via the diode of the second switch element 140. Within phase I, the first gate driver 122 sets a first variation of the first current profile from the time t1 at the first control contact 124 for closing the first switch element 120, so that an increase in the voltage UG1 results. Approximately in the middle of phase II, the voltage UG1 reaches the so-called Miller plateau, which lasts until approximately the middle of phase III. In the second half of phase III, the voltage UG1 approaches the highest voltage value. The first switch element 120 is then closed. In phase IV, from time t4, the closed switching status of the first switch element 120 is maintained. Preferably, the voltage UG1 in phase IV remains constant at the high level or the highest voltage value and no longer changes, as preferably the current profile at the control contact 124 is also kept constant. The second switch element 140 of the half-bridge 110 should remain open so that the half-bridge 110 is not short-circuited. Therefore, the second current profile across phases I, II, III, IV is not changed or varied by means of the second gate driver 142 at the second control contact 144 during the closing of the first switch element 120. The resulting voltage UG2 therefore remains constant over the period under consideration. The lower diagram shows the resulting voltage progression UDS1 across the first switch element 120 and the resulting voltage progression UDS2 across the second switch element 140. As the voltage UG1 increases, the voltage UDS1 across the first switch element 120 begins to fall from the time the switching threshold of the first switch element 120 is reached in phase I, due to the closing of the first switch element 120 as a result of the commutation of the current ID2 from the second switch element 140 to the first switch element 140. From the middle of phase II and when the current ID1 through the first switch element 120 reaches its maximum, the voltage UDS1 at the first switch element 120 drops constantly, as voltage commutation takes place at the first switch element 120. The current ID1 through the first switch element 120 reaches its maximum when the current ID2 through the diode of the second switch element 140 reaches its minimum, the so-called reverse current peak. Towards the end of phase III, the voltage UDS1 reaches its lowest level, approximately 0 volts. The switch is then closed. A minimum voltage drop results from the current ID1 flowing through the closed first switch element 120 and its resistance. During the drop in the voltage UDS1, the voltage UDS2 across the second switch element 140 increases. A sharp increase in the voltage UDS2 occurs from the middle of phase II, when the maximum current ID1 is reached by the first switch element 120, as an additional oscillation is superimposed on the voltage commutation of the first switch element 120 due to the diode properties of the second switch element 140. When switching a load 108, preferably inductive, connected in parallel with the second switch element 140 by means of the first switch element 120, a freewheeling path through the second switch element 140 is required for the resulting load current. This is preferably the case for switch elements with an intrinsic diode structure. Preferably, such a freewheeling path can also be provided by arranging an antiparallel diode to the second switch element 140. The current ID1 through the first switch element 140 is proportional to the mean voltage UDS2 applied to the load 108. When the load is switched on, the current ID2 commutates from the diode or freewheeling diode of the second switch element 140 to the first switch element 120. In the region of the reverse current peak of the diode, it picks up the average voltage. Depending on the speed at which the first switch element 120 is switched on and the internal structure of the diode of the second switch element 140, reverse voltage is applied to the freewheeling diode of the second switch element 140 at different speeds. The resulting du/dt can exceed the du/dt of the switch-on of the first switch element 120, possibly considerably, due to the semiconductor properties of the freewheeling diode. Due to this high du/dt, the voltage progression UDS2 shown results at the second switch element 140 with the large and high-frequency oscillations, which decay in the course of phase III, between the times t3 and t4. From time t4, the essentially constant voltage UDS2 is present at the second switch element 140, which was present as voltage UDS1 at the first switch element 120 before the first switch element 120 began to close. The high-frequency oscillations between the times t2 and t4 generate strong electromagnetic emissions. These electromagnetic emissions interfere with the entire electrical system and must therefore be minimized. The high-frequency surges that occur result from effects due to the semiconductor behavior, which occur during short-term unwanted conductive phases of the second switch element during the closing of the first switch element. The electromagnetic interference can be reduced by switching on or closing the first switch element 120 more slowly. However, this leads to increased turn-on losses, which are also not desired.

Figure 3:
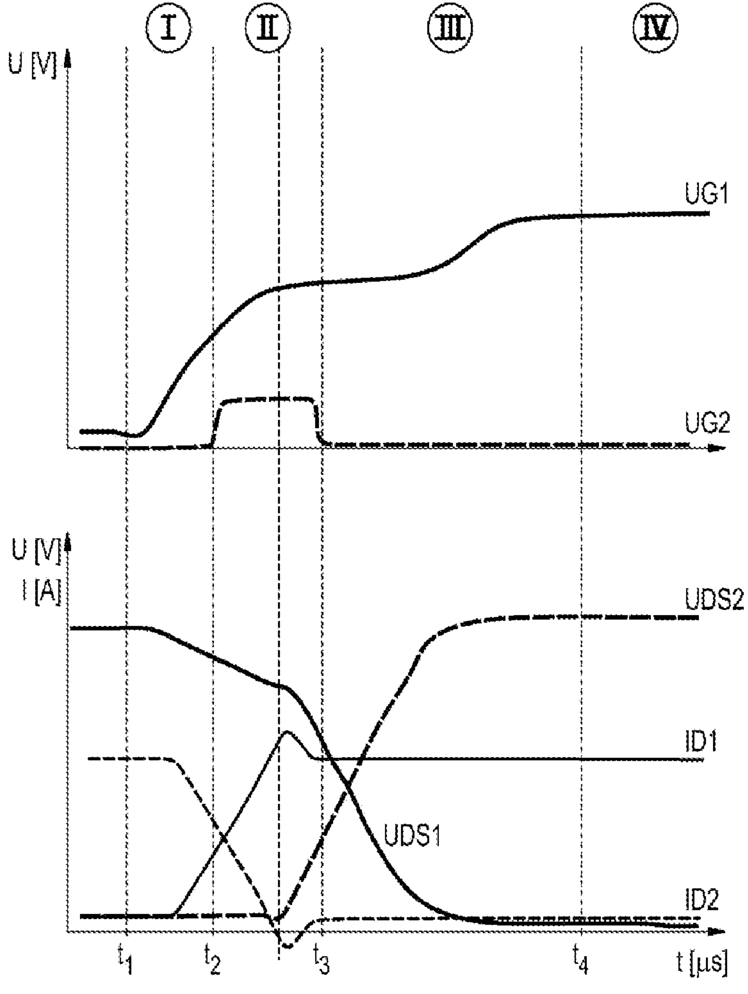
FIG. 3 schematic voltage, current/time diagrams showing an alternative qualitative voltage progression at the control contacts of the switch elements and the voltages and currents at the switch elements.

FIG. 3 shows schematic voltage/current/time diagrams for an exemplary embodiment of the invention. In contrast to the explanations already provided in regard to FIG. 2, the second current profile during phase II is varied by means of the second gate driver 142 at the second control contact 144 of the second switch element 140 during the closing of the first switch element 120. In this case, a second voltage and/or a second impedance is set at the second control contact 144 of the second switch element 140 in order to actuate the second switch element 140. Preferably, the second current profile is set by means of the second gate driver 142 at the second control contact 144 during the closing of the first switch element 120 in parallel with phase II, a period at which the current commutation takes place and the current ID1 through the first switch element 120 increases sharply and reaches its maximum as an overshoot up to a point in time at which the current ID1 essentially settles to the load current and the current commutation ends, whereby the current ID2 through the second switch element decreases in the opposite direction and reaches its minimum with the negative reverse current peak in order to then swing to essentially zero amperes. Preferably, the second current profile is varied by means of the second gate driver 142 at the second control contact 144 at least before the Miller plateau begins or before the maximum of the current ID1 is reached by the first switch element 120. Preferably, the second current profile is varied by means of the second gate driver 142 at the second control contact 144 at least until the current ID1 has again assumed a constant value after the maximum has decayed or until the current ID2 has again assumed a constant value after the reverse current peak of the diode has passed. Preferably, the second current profile at the control contact 144 is varied such that a voltage profile UG2 is obtained, as shown in FIG. 3. Preferably, the level of the second current profile at the control contact 144 is set or regulated such that a changed voltage UDS2 results, the voltage increase du/dt of which is significantly damped or attenuated compared to the voltage UDS2 in FIG. 2. The second current profile is preferably varied as a function of the properties of both the first and the second switch elements 120, 140 and preferably as a function of the size of the load 108, thus resulting different voltages UG2 which are adjustable in terms of level and shape. Preferably, these properties or the operating point are read in by means of the parameter P. Preferably, phase II results in a voltage UG2 whose voltage level is higher than in phases I, III and IV. For actuating accordingly, the resulting voltage progression UDS1 across the first switch element remains unchanged from that in FIG. 2, with the voltage UDS2 increasing at fewer oscillations. This advantageously leads to lower electromagnetic emissions. Preferably, an ideal variation of the voltage UDS2 results when the second variation of the second current profile is set by means of the second gate driver 142 at the second control contact 144 such that an increased voltage UG2 is obtained at the gate of the second switch element 140 during phase II compared to the voltage UG2 in phase I and phase III. Preferably, due to the lower electromagnetic emissions, the voltage UDS1 at the first switch element 120 can be commutated faster in time.

Figure 4:
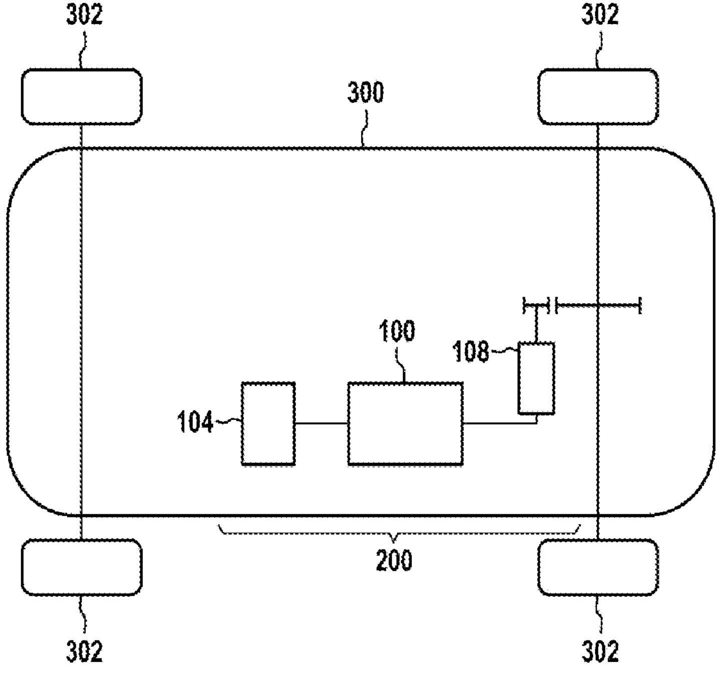
FIG. 4 a schematic illustration of a vehicle comprising a drivetrain.

FIG. 4 shows a schematic illustration of a vehicle 300 comprising a drivetrain 200. The embodiment shows an exemplary vehicle 300 comprising four wheels 302, whereby the invention is equally applicable in any desired vehicle comprising any desired number of wheels on land, on water, and in the air.

The drivetrain 200 preferably comprises a current converter 100 comprising a traction battery as a DC voltage source 104, and/or an electric machine as a load 108.

Figure 5:
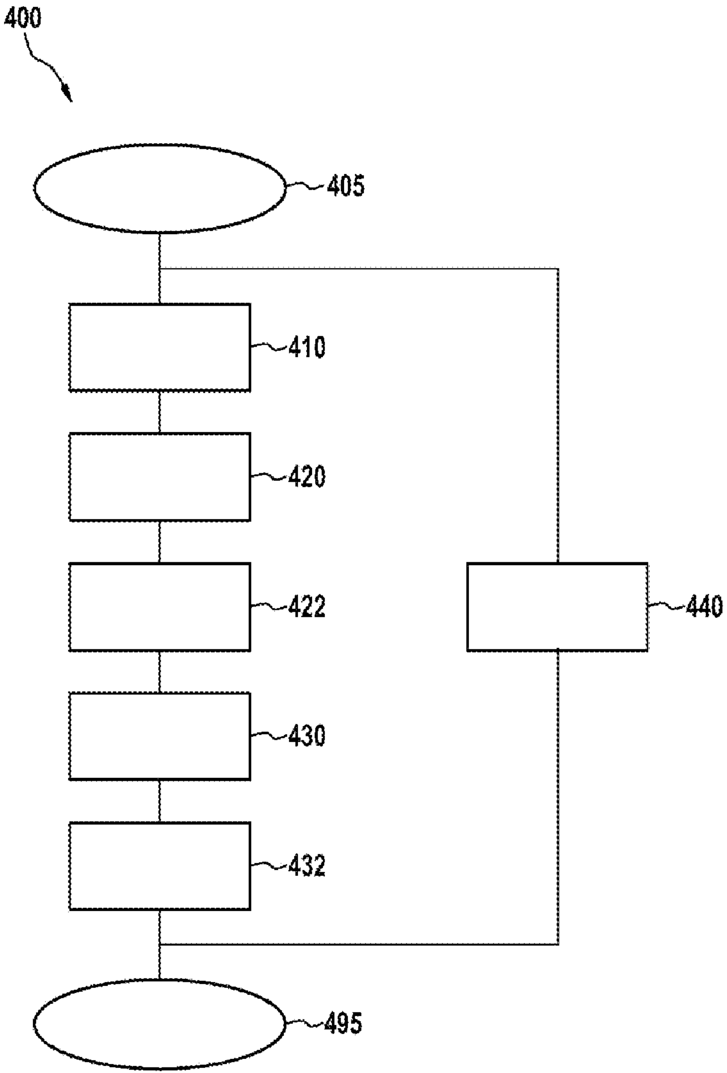
FIG. 5 a schematically illustrated flow chart for a method for actuating a first and a second switch element of a half-bridge in a current converter.

FIG. 5 shows a schematic sequence of a method 400 for actuating a first 120 and a second 140 switch element of a half-bridge 110 in a current converter 100. The method starts with step 405. In step 410, at least one parameter P is read in, which characterizes an operating point of the half-bridge 110. In step 420, a first variation of the first current profile is determined as a function of the parameter P. In step 422, a second variation of the second current profile is determined as a function of the parameter P. In step 430, the first variation of the first current profile is set by means of the first gate driver 122 at the first control contact 124 for closing the first switch element 120. In step 432, the second variation of the second current profile is set by means of the second gate driver 142 at the second control contact 144 during the closing of the first switch element. Preferably in step 440 and preferably in parallel with the other method steps, the current profile at the second control contact 144 of the second switch element 140 is detected during the closing of the first switch element 120. As a function of the detected current profile at the second control contact 144, the second gate driver 142 sets a third current profile at the second control contact 144 of the second switch element 140 by setting a third voltage and/or a third impedance, which prevents the second switch element 140 from closing. The method ends at step 495.

The invention claimed is:

1. A method (400) for actuating a first (120) and a second (140) switch element of a half-bridge (110) in a current converter (100), wherein the actuation comprises maintaining a switching status and closing or opening a switch element (120, 140), wherein the current converter (100) comprises an input connector (102) for connecting a DC voltage source (104), an output connector (106) for connecting a load (108) in parallel with the second switch element (140) of the half-bridge (110), a first gate driver (122) for actuating the first switch element (120), and a second gate driver (142) for actuating the second switch element (140), wherein the first (120) and the second (140) switch elements are connected in series between the potentials of the input connector (102), and an intermediate tap (107) between the first (120) and the second (140) switch element is connected to the output connector (106), wherein, by setting a first voltage and/or a first impedance at a first control contact (124) of the first switch element (120), the first gate driver (122) sets a first current profile at the first control contact (124) to actuate the first switch element (120), wherein, by setting a second impedance at a second control contact (144) of the second switch element (140) the second gate driver (142) sets a second current profile at the second control contact (144) to actuate the second switch element (140), wherein, during operation of the current converter (100), the first switch element (120) is closed and opened, and the second switch element (140) is then closed and opened in a continuously repeating manner so that one of the potentials of the input connector (102) is alternately applied to the output connector (106), the method comprising:

reading in (410) at least one parameter which characterizes an operating point of the half-bridge (110), determining (420) a first variation of the first current profile as a function of the parameter, setting (430) the first variation of the first current profile by means of the first gate driver (122) at the first control contact (124) to close the first switch element (120), wherein the following steps:

determining (422) a second variation of the second current profile as a function of the parameter, setting (432) the second variation of the second current profile by means of the second gate driver (142) at the second control contact (144) during the closing of the first switch element (120).

2. The method according to claim 1, wherein the current converter (100) comprises a data storage means (160), and the data storage means (160) comprises a characteristic map (162), wherein variations of the first and the second current profiles in the characteristic map (162) are associated with different values for the parameter, and wherein the determination of a first variation of the first current profile and a second variation of the second current profile as a function of the parameter comprises the selection of a first variation of the first current profile and a second variation of the second current profile from the characteristic map (162) as a function of the value of the parameter read in.

3. The method according to claim 1, wherein the current converter (100) comprises a model (170) of the first (120) and/or second (140) switch element, and wherein determining (420, 422) a first variation of the first current profile and a second variation of the second current profile as a function of the parameter comprises determining (420, 422) a first variation of the first current profile and a second variation of the second current profile by means of the model (170) as a function of the value of the parameter read in.

4. The method according to claim 1,
wherein setting (430) the first variation of the first current profile by means of the first gate driver (122) for closing the first switch element (120) comprises increasing the voltage at the first control contact (124), and
setting (432) the second variation of the second current profile by means of the second gate driver (142) during the closing of the first switch element (120) comprises a chronologically limited variation of an amplitude, a basic shape, a pulse width, and the level of a constant current profile, during the increase of the voltage at the first control contact (124) within the period in which the voltage at the first control contact (124) increases from a first voltage value to a second voltage value.

5. The method according to claim 1,
wherein setting (430) the first variation of the first current profile by means of the first gate driver (122) to close the first switch element (120) comprises increasing the voltage at the first control contact (124), and
setting (432) the second variation of the second current profile by means of the second gate driver (142) during the closing of the first switch element (120) comprises a chronologically limited increase of the impedance or the voltage at the second control contact (144) during the increase of the voltage at the first control contact (124) within the period in which the voltage at the first control contact (124) increases from a first voltage value to a second voltage value.

6. A current converter (100) comprising a half-bridge (110) having a first (120) and a second (140) switch element,
wherein the current converter (100) comprises an input connector (102) for connecting a DC voltage source (104), an output connector (106) for connecting a load (108) in parallel with the second switch element (140) of the half-bridge (110), a first gate driver (122) for actuating the first switch element (120), and a second gate driver (142) for actuating the second switch element (140),
wherein an actuation comprises maintaining a switching status and closing or opening a switch element (120, 140),
wherein the first (120) and the second (140) switch elements are connected in series between the potentials of the input connector (102), and an intermediate tap (107) between the first (120) and the second switch element (140) is connected to the output connector (106), wherein, by setting a first voltage and/or a first impedance at a first control contact (124) of the first switch element (120), the first gate driver (122) sets a first current profile at the first control contact (124) to actuate the first switch element (120),
wherein, by setting a second impedance at a second control contact (144) of the second switch element (140), the second gate driver (142) sets a second current profile at the second control contact (144) to actuate the second switch element (140),
wherein, during operation of the current converter (100), the first switch element (120) is closed and opened, and the second switch element (140) is then closed and opened in a continuously repeating manner so that one of the potentials of the input connector (102) is alternately applied to the output connector (106),
wherein the current converter (100) is configured to:
read in a parameter that characterizes an operating point of the half-bridge (110),
determine a first variation of the first current profile as a function of the parameter,
set the first variation of the first current profile by means of the first gate driver (122) at the first control contact (124) to close the first switch element (120),
wherein the current converter (100) is configured to:
determine a second variation of the second current profile as a function of the parameter,
set the second variation of the second current profile by means of the second gate driver (142) at the second control contact (144) during the closing of the first switch element (120).

7. A drivetrain (200) comprising a current converter (100) according to claim 6.

8. A vehicle (300) comprising a drivetrain (200) according to claim 7.

9. A non-transitory, computer-readable medium comprising instructions which, when executed by a current converter cause the current converter to
read in (410) at least one parameter which characterizes an operating point of a half-bridge (110),
determine (420) a first variation of a first current profile as a function of the parameter,
set (430) the first variation of the first current profile by means of a first gate driver (122) at a first control contact (124) to close a first switch element (120), wherein the first gate driver (122) sets the first current profile by setting a first voltage and/or first impedance at the first control contact (124),
determine (422) a second variation of the second current profile as a function of the parameter, and
set (432) the second variation of the second current profile by means of a second gate driver (142) at a second control contact (144) during the closing of the first switch element (120), wherein the second gate driver (142) sets the second current profile by setting a second impedance at the second control contact (144).

* * * * *